(12) United States Patent
Celi, Jr. et al.

(10) Patent No.: US 8,931,081 B2
(45) Date of Patent: Jan. 6, 2015

(54) DEVICE IDENTIFICATION FOR EXTERNALIZING PASSWORD FROM DEVICE COUPLED WITH USER CONTROL OF EXTERNAL PASSWORD SERVICE

(75) Inventors: Joseph Celi, Jr., Boca Raton, FL (US); Mark Alexander McGloin, Dublin (IE); Harshita Nersu, Dublin (IE); Olgierd Stanislaw Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 13/590,683

(22) Filed: Aug. 21, 2012

(65) Prior Publication Data

US 2014/0059671 A1 Feb. 27, 2014

(51) Int. Cl.
G06F 21/31 (2013.01)
G06F 21/32 (2013.01)
G06F 21/30 (2013.01)

(52) U.S. Cl.
CPC .............. *G06F 21/32* (2013.01); *G06F 21/305* (2013.01)
USPC ........................................................ 726/18

(58) Field of Classification Search
CPC ............................... G06F 21/305; G06F 21/32
USPC ......................................................... 726/18
See application file for complete search history.

(56) References Cited

U.S. PATENT DOCUMENTS

| 7,957,532 | B2 | 6/2011 | Chen et al. | |
|---|---|---|---|---|
| 2006/0136739 | A1 | 6/2006 | Brock et al. | |
| 2008/0077809 | A1* | 3/2008 | Hayler et al. | 713/193 |
| 2008/0228867 | A1* | 9/2008 | Murphy et al. | 709/203 |
| 2009/0104888 | A1 | 4/2009 | Cox | |
| 2009/0222908 | A1* | 9/2009 | Warren | 726/18 |
| 2010/0037046 | A1* | 2/2010 | Ferg et al. | 713/155 |
| 2011/0154459 | A1* | 6/2011 | Kuang et al. | 726/6 |
| 2011/0207433 | A1 | 8/2011 | Miyamoto | |
| 2013/0014236 | A1* | 1/2013 | Bingell et al. | 726/6 |
| 2013/0086388 | A1* | 4/2013 | Tesch et al. | 713/183 |

FOREIGN PATENT DOCUMENTS

| EP | 1538855 | 6/2005 |
|---|---|---|
| EP | 2339807 | 6/2011 |

OTHER PUBLICATIONS

Hardt, D.; "The OAuth 2.0 Authorization Framework—draft-ietf-oauth-v2-30", retrieved on Jul. 17, 2012, from http://tools.ietf.org/html/draft-ietf-oauth-v2-30.

searchsoa.com, "REST (representational state transfer)"; retrieved on Jul. 17, 2012, from http://searchsoa.techtarget.com/definition/REST?vgnextfmt=print.

* cited by examiner

*Primary Examiner* — Techane Gergiso
(74) *Attorney, Agent, or Firm* — Robert H. Frantz; Jeffrey S. LaBaw

(57) ABSTRACT

Information and data stored by a mobile device is protected by comprising applying password-protection to the locally-stored information without persistently storing the corresponding password locally. Rather, the corresponding password is stored by a remote password server. In response to a trigger event on the mobile device, such as an unlocking action by the user, a request is sent by the mobile device to the password server to retrieve the corresponding server, and the corresponding password is returned to the mobile device. The mobile device can then use the password to access the protected information. If the user determines that the mobile device is lost, stolen, or out of the user's physical control, the user may access the password server and disable the sending of the password to the mobile device, thereby thwarting attempts to access the protected data on the mobile device.

16 Claims, 5 Drawing Sheets

DEVICE IDENTIFICATION FOR EXTERNALIZING PASSWORD FROM DEVICE COUPLED WITH USER CONTROL OF EXTERNAL PASSWORD SERVICE

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The invention generally relates to methods and mechanisms to protect data and information stored on mobile devices which, if physical control of the mobile device is lost, may be compromised by unauthorized users.

BACKGROUND OF INVENTION

Mobile devices such as smart phones, cellular phones, netbooks, pad computers, tablet computers and laptop computers can contain a wealth of private information of the user or owner. Some of this information is intentionally stored in the mobile device and is known to be there by the user or owner, while other information is stored in the device due to the manner in which certain components operate without the user or owner necessarily knowing it is there. Examples of the former are passwords and passcodes which the user authorizes or configures the device to store and use on behalf of the user. Example of the latter include data which is stored by the device by virtue of its operation, such as information stored in a cache memory.

Because these types of mobile devices are often expensive, they have intrinsic value to thieves for possible resale of the device itself, and they also present an opportune target for identity theft due to the information they contain.

In the case of theft of such a mobile device, passwords stored on a device can be cracked allowing the thief to steal any of the information. One current approach to solve this problem is locking the device with a master password which must be entered in order to access or use the device. Incorrect entry of the master password can trigger deletion of the confidential information stored by the device. This prevents access of the confidential data by anyone who cracks the password.

However, the requirement to enter such a password prior to use, and the optional requirement to intentionally lock the device by the user between uses, can be annoying to users that don't want to have to type in a long password in order to use the phone. This inconvenience leads to many users bypassing or not installing this additional security mechanism.

With the increasing trend in consumerization of devices used by employees to perform their business function, such mobile devices increasingly store corporate confidential information as well as personal confidential information, such as phone lists, email addresses, passwords to log into virtual private networks, certificates to authenticate the user to certain enterprise operations such as reviewing customer orders, accessing financial data, etc.

However, Information Technology departments are finding it increasingly difficult to enforce security policy in the same way they can on company-owned computing devices. Users want to be able to use their own personal or private device for business use without the hassle of having to enter a password every time they want to unlock the phone.

SUMMARY OF EXEMPLARY EMBODIMENTS OF THE INVENTION

Information and data stored by a mobile device is protected by comprising applying password-protection to the locally-stored information without persistently storing the corresponding password locally. Rather, the corresponding password is stored by a remote password server. In response to a trigger event on the mobile device, such as an unlocking action by the user, a request is sent by the mobile device to the password server to retrieve the corresponding server, and the corresponding password is returned to the mobile device. The mobile device can then use the password to access the protected information. If the user determines that the mobile device is lost, stolen, or out of the user's physical control, the user may access the password server and disable the sending of the password to the mobile device, thereby thwarting attempts to access the protected data on the mobile device.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
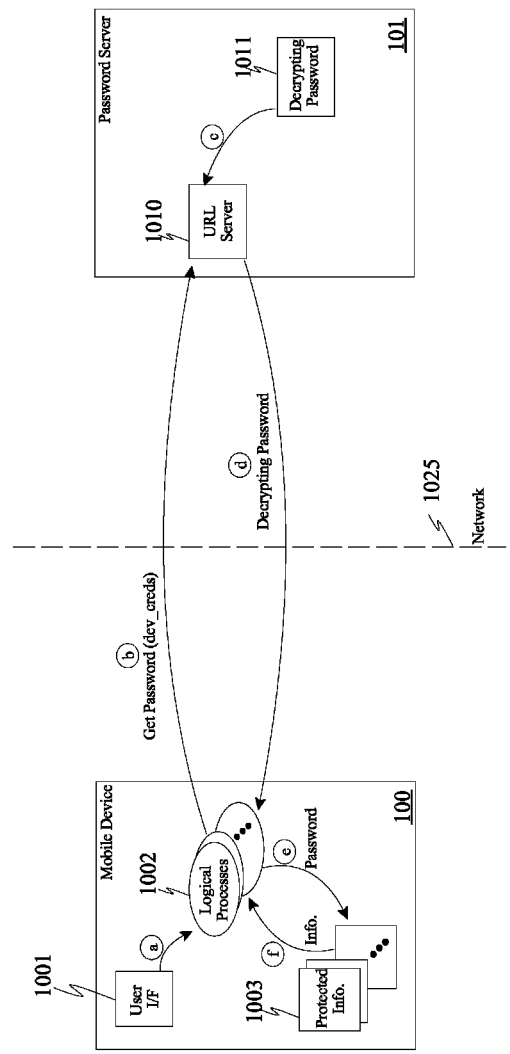
FIG. 1 illustrates interactions of components of a system according to the present invention to request and receive a remotely-stored password for locally-stored protected information.

The inventors of the present and the related invention have recognized problems not yet recognized by those skilled in the relevant arts regarding convenient yet effective methods for allowing personal mobile devices to protect confidential computing enterprises and resources.

Embodiments according to the invention provide for data to be encrypted on a mobile device with a key or password, externalizing the password from the device and providing a Uniform Resource Locator (URL) where the mobile device can automatically retrieve the password as part of the decryption process. In the case of theft or compromise of the URL, the URL can be disabled automatically or manually by a corporate administrator, thereby preventing any unauthorized user from being able to decrypt the data on the device. The phone can identify itself to the password URL using a number of mechanisms, depending on the nature of the current security schemes and mechanisms already in place in the computing environment.

Although various solutions exist for protecting data on devices, the present inventors have recognized that none of these solutions consider the problem of how to protect data automatically without the inconvenience of the user managing the password on the device or being in control of disabling that protection.

Token Exchange.

Some of the currently known and currently used networked computing security processes employ exchanging a first token for a second token during the authentication process. For existing system designs using this pattern, typically a user or device authenticates and receives a first token token1, and then the first token is exchanged for a second token token2. With an enhancement according to the present invention, the user or device does not authenticate to receive token1, but instead token1 is stored on the mobile device. Subsequently, the exchange of token1 for token2 is used to provide a means to disable, as opposed to enable, the use of the mobile device through blocking access to token2 rather than a means to verify the identity of the owner of token1.

Long-Term Session Key.

Another networked computing security process often employed in systems having current technology involves a long-term session key and a short-lived token. The long-term session key is periodically or occasionally exchanged for a new short-lived key. An open standard for such a scheme is OAuth promulgated by the IETF organization, which is presently in version 2.0 (draft) status.

Oauth 2.0 allows a user to avoid repeated authentication by having a long term refresh token that can be exchanged for a short lived OAuth token (session key). It relies on keeping the long term token secure, e.g. by coupling with a shared secret, and the long term token can be invalidated on the server in case of a security breach. The differences in this approach and embodiments according to the present invention are:

- The device is downloading the encryption key from an external server to a device to decrypt resources on the device itself (e.g. protecting local resources instead of remote resources. In Oauth, the device is downloading a session key used to access resources external to the device (e.g. protecting remote resources, not local resources).
- The user owns both the device and the location of the external token according to the present invention, whereas in OAuth, the user does not own the location of the external token.
- The mobile device can verify its identity using a number of mechanisms, whereas OAuth is limited to using a refresh token as defined in the IETF's OAuth specification/recommendation.

Linking Mobile Device to User Credentials.

A well-known secondary mechanism for authenticating a user or device to a service is to use a unique identification associated with the mobile device, such as a mobile telephone number or electronic serial number (ESN). The currently-known pattern of having the device automatically initiate a call to a service as a mechanism for identifying the device to the service can be used in embodiments according to the present invention, but in such enhanced embodiments, a password or token to unlock the device would not be automatically returned to the device as a result.

Remote Key Storage Associated with Mobile Device.

According to U.S. Pat. No. 7,957,532 to Yugun Chen, et al., a method is provided whereby a mobile device, not the user of the mobile device, is authenticated to a remote server, wherein the remote server stores a key which has been used to previously encrypt certain data on the mobile device. When the device is successfully authenticated, the server passes the key to the mobile device so that it may decrypt the data stored on it locally. Embodiments according to the present invention, however, operate differently in addition to or in place of this functionality:

- Embodiments of the present invention authenticate the user of the mobile device rather than authenticating the device itself. A key problem solved by the present invention is that users do not want to enter long passwords on their own devices, and that stolen mobile devices should not automatically authenticate themselves to the server where the decryption keys are held.
- The process of authenticating the user, however, is still fully automated so that the user does not have to enter a long and sometimes difficult to remember unlocking password.
- The user is in control of the "key server", for which they have separate credentials, which enables the user to disable the key server if they believe the phone is stolen, or even temporarily if they must surrender the phone for a period of time, such as when entering a secure facility or building. The user may re-enable the key server when the phone is found or when it is returned to the user, such as when exiting a secure facility or building.

Logical Processes According to the Present Invention.

The following logical processes may be realized in electronic circuitry, such as in customized integrated circuit design, or in a combination of programmable processor executing program code or program instructions, or in a combination of electronic circuitry, program code and a processor.

Many embodiments according to the invention consist of the following elements and interactions between the elements:

(a) a password to secure data and information on the mobile device, which can be used to just lock the mobile device or to encrypt data on the device;

(b) an external, and preferably remote password server which stores the password, some embodiments including one or more communications networks between the password server and the mobile device such as a mobile telephone network (cellular, etc.), a wireless data network (WiFi, Ricochet, satellite, etc.), a wired network (PSTN, LAN, USB, FireWire, etc.), and an optical network;

(c) the mobile device automatically retrieving that password from the password server when it needs to unlock the mobile device or decrypt either information or data stored locally on the mobile device (the mechanism to retrieve that password may be a representational state transfer (REST) call, a webservice call, or a multitude or combination of other suitable mechanisms for communicating over a data network);

(d) a trigger to retrieve the password, wherein the trigger may comprise a user selecting an option to unlock the phone, e.g. slide button, swipe sequence, fingerprint recognizer, voice recognizer, free space gesture detected by a motion detector of the mobile device, or a user or program on the mobile device attempting to access data encrypted with the password;

(e) authentication by the mobile device to the password server;

(f) retrieving or receiving the password from by the mobile device from the password server; and (g) responsive to the device being stolen, misplaced, or otherwise at risk of compromise (e.g. surrendered on condition of entry to a facility, etc.), authenticating by the user to the password server to disable the password server from providing the password to the mobile device until re-enabled (The mechanisms by which the user can access the password server can be via a secondary mobile device or any computing device and the mechanisms by which they authenticate themselves to that password server can be any suitable authentication mechanism. The authentication credentials should be separate from any device credentials and the password must be different than that returned to the device by the password server).

Figure 3:
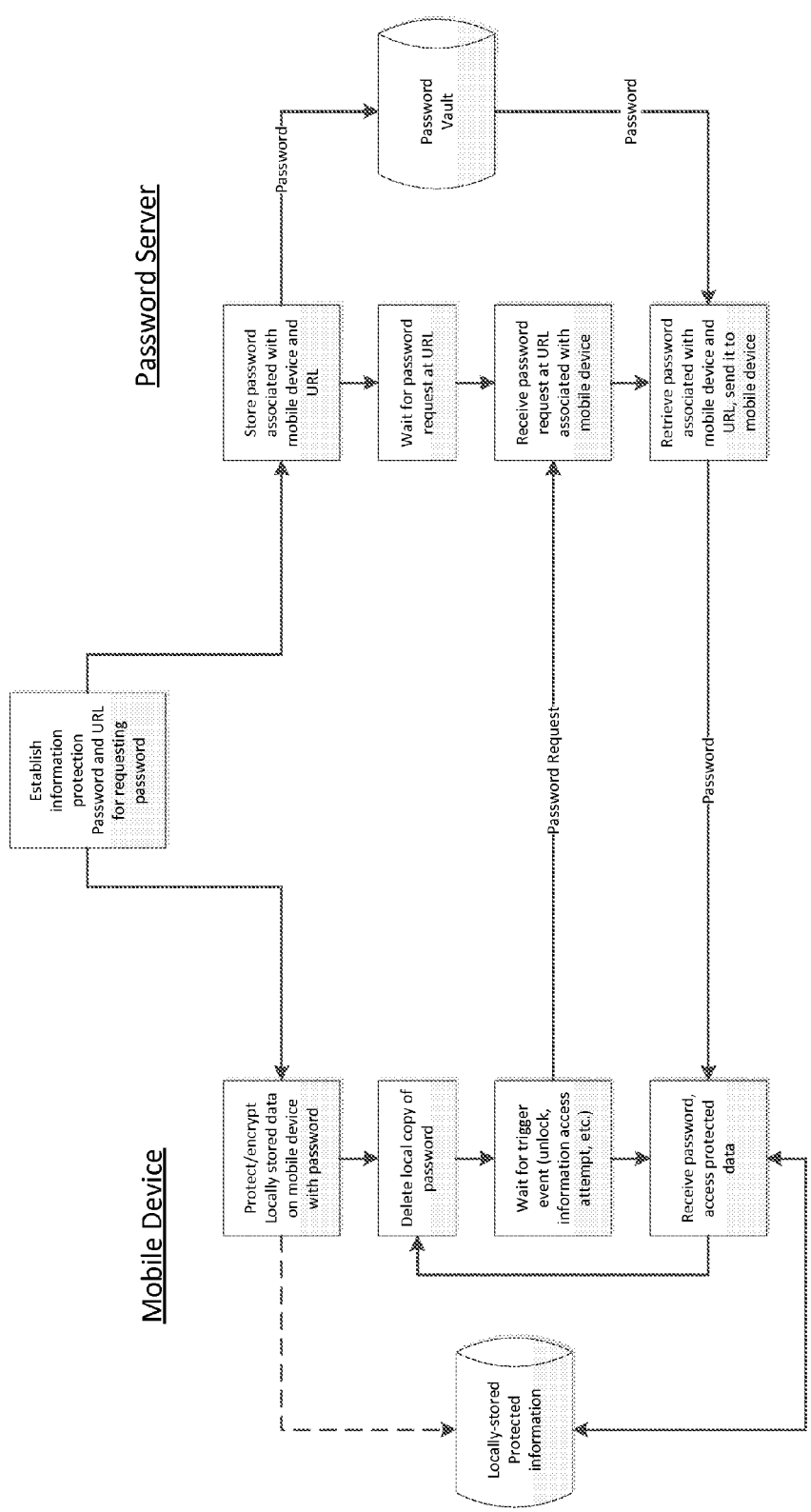
FIG. 3 illustrates a logical flow of actions according to the present invention for automatically retrieving a password from a remote password server in order to access locally-stored protected data.

FIGS. 1 and 3, which are described in more detail in the following paragraphs, show the interactions between components of a system according to the present invention in one particular use of the password, i.e. to unlock the device. Responsive to the user unlocking the mobile device, it identifies itself to the password server, preferably by a pre-determine URL, using one or more mechanisms:

by sending to the password server a key or token stored on the mobile device;

by sending to the password server text message such as a Short Messaging Service (SMS) message, that uniquely identifies the mobile device to the password server; and by initiating a phone call to the password server, such as to a pre-determined URL or telephone number, to uniquely identify the mobile device to the password server.

Figure 2:
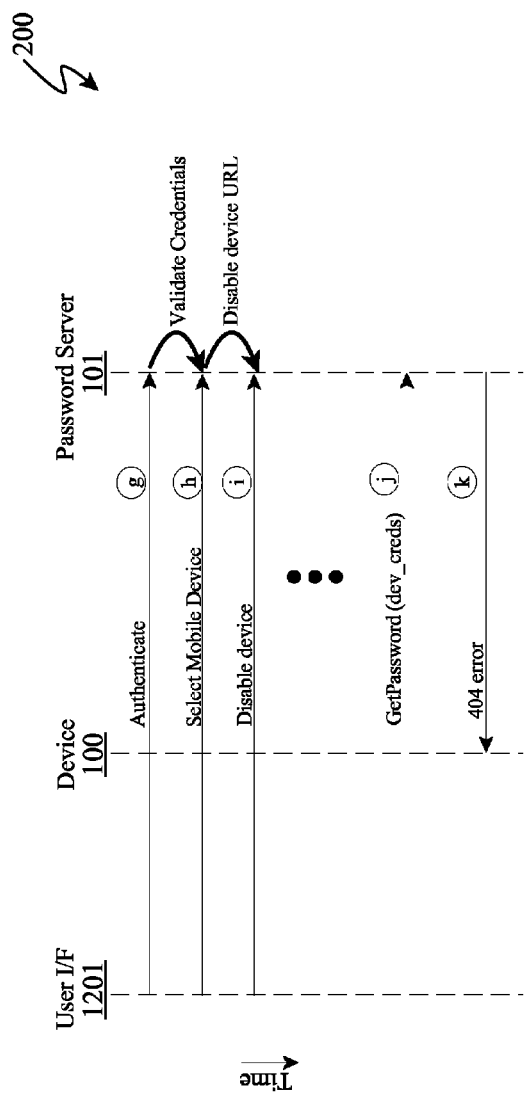
FIG. 2 depicts the communications process for a user to disable the returning of the password to the mobile device when the mobile device has been stolen, lost, or surrendered out of the user's control.
Figure 4:
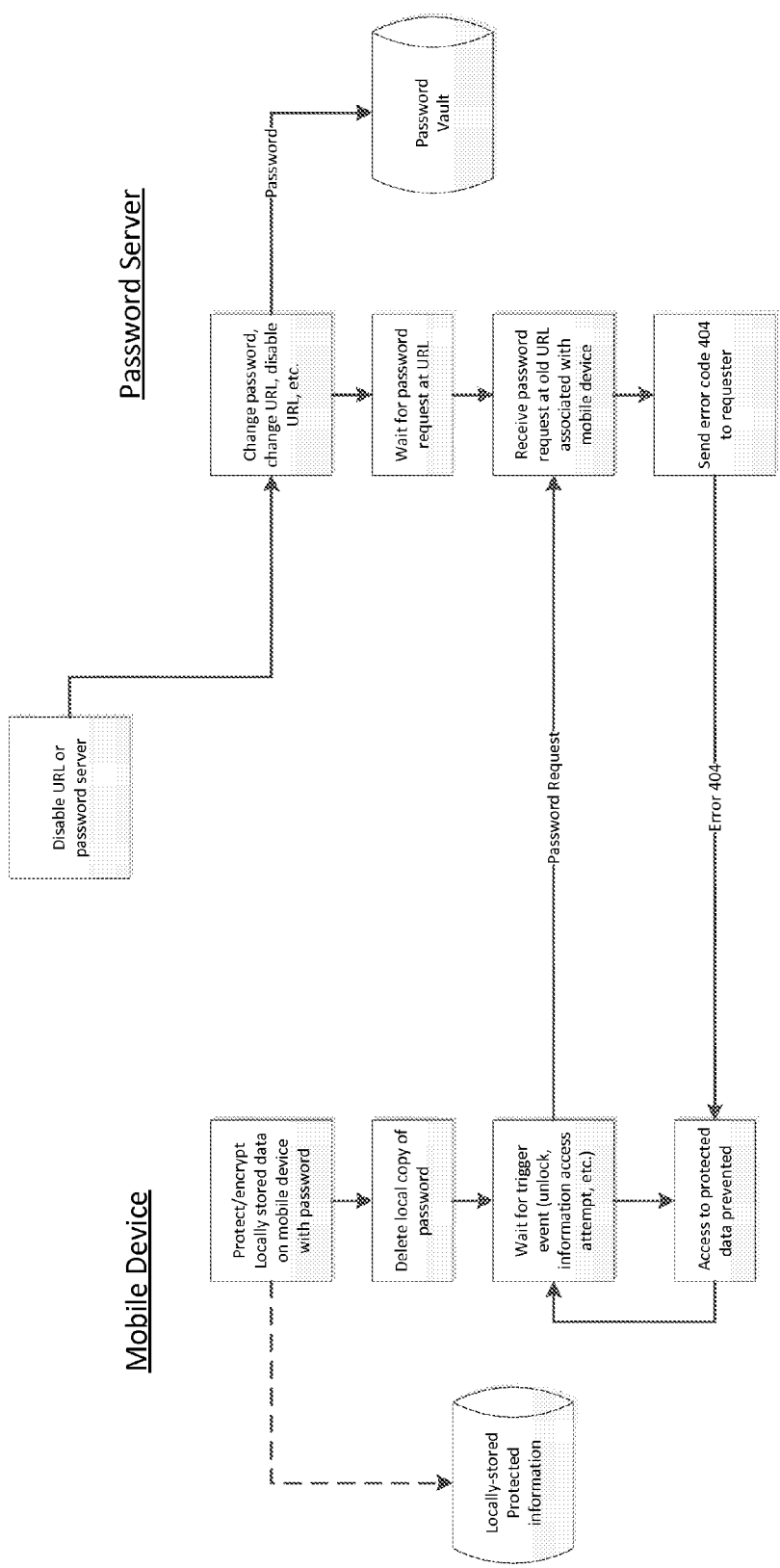
FIG. 4 illustrates another logical flow of actions according to the present invention for disabling the mobile device from retrieving the password, thereby disabling access to the locally-stored protected data.

When the device is stolen, lost, or otherwise at risk of being compromised, the user can disable the data-protecting password and thus prevent anyone from either unlocking the device or decrypting the confidential information on the mobile device. FIGS. 2 and 4, which are also described in more detail in the following paragraph, depict example embodiments of such a process. Steps of at least one logical process according to the present invention include:

(a) The user authenticates to the password server using a device other than the mobile device (e.g. another mobile device, a web browser, etc.) with a set of credentials to a service on the password server for managing their mobile device. These credentials are different from any credentials on the mobile device or the password that is returned to the device as part of the unlocking/decryption process.

(b) The user will be presented with the devices they have registered and will select the device in question.

(c) The user disables the mobile device on the password server. This can be implemented in many ways such as disabling a REST service URL from which the password is retrieved, for example.

(d) If the mobile device attempts to retrieve a password from the password server, it will get returned an error, such as a "404" error, if the password is retrieved using a hypertext transfer protocol (HTTP) call to a REST URL. This prevents the device from being unlocked or data being decrypted on the device. The user can re-enable the password via the password server later if they find their device or otherwise regain control of it.

Illustrations of Logical Processes.

Referring now to FIG. 1, at least one available process of interaction between systems components according to the invention is shown. A user's mobile device (100), devices such as a smart phone, cellular phone, netbook computer, pad computer, tablet computer or laptop computer, contains one or more items of protected information (1003), such as data files, a list of passwords and login names, photographs, web browsing history, etc. For the purposes of the present invention, this information is stored "locally" on the mobile device in tangible, computer-readable storage memory devices such as random access memory, flash memory, hard drives, etc. It is protected by a decrypting password (1011) which is not stored on the mobile device (100), and which is stored remotely on a password server (101). By "remotely", inventors mean on a separate computing platform from the mobile device, and preferably interconnected by a computing network (1025) such as a telephone network, data network, etc., such that physical access to one (the mobile device or the password server) does not imply physical access to the other (mobile device or the password server).

According to a logical process according to the present invention, a user uses the user interface (1001) of the mobile device (100) to unlock (a) the mobile device, such as through operating a slide button, performing a screen swipe sequence, operating a fingerprint recognizer, operating a voice recognizer, or performing a free space gesture detected by a motion detector of the mobile device. Optionally, another trigger to a process according to the present invention is detection of a user attempt or program request (1002) to access the protected information (1003) stored locally on the mobile device.

Responsive to a user unlocking the device, or responsive to a program or user attempting to access the protected locally-stored information, an electronic circuit, a logical process being executed by a processor, or combination of circuit and execution of a logical process (1002) sends a password request (b) to the password server (101), such as transmission via the network (1025). The password request in at least one embodiment includes one or more credentials for the mobile device, and the request is sent to a special URL which is indicated or set aside for this operation. The password server (101) then retrieves the decrypting password (1011) which is stored by the password server in tangible, computer-readable storage memory device(s), and transmits (d) the decrypting password to the mobile device (100, 1002), preferably via the network (1025).

The logical processes (1002) of the mobile device (100) may now use this password (1011) to decrypt or otherwise access (e, f) the protected information (1003). According to at least one embodiment according to of the invention, the password is not persistently stored by the mobile device, and is deleted upon powering the mobile device off, locking it, or even upon expiration of a timer, thereby requiring occasional or periodic retrieval of the decrypting password from the password server. In some embodiments, the password may be retrieved every time it is needed to access the locally-stored information. In other embodiments, the password may be used for a period of time, and then it may be refreshed after that period of time. An advantage of the per-use retrieval is that each and every instance of accessing the protected information is interlocked with the password server and continued enablement by the user, but this also requires the most transactions and communications between the mobile device and the password server. An advantage of the periodically expiring password and refreshing of the password is that transactions and communications between the mobile device and the password server are reduced, but the ability of the user to immediately disable access to the protected data is also reduced according to the expiration period length.

FIG. 3 illustrates a logical flow of actions of a mobile device and a password server corresponding to the example embodiment of FIG. 1.

Turning now to FIG. 2, a signal flow diagram (200) illustrates a logical process according to the present invention for a user to disable access to the confidential information stored on the mobile device, such as when the mobile device has been lost, stolen, or physically surrendered. Using a user interface (1201) on another device, the user authenticates (g) to the password server (101), However, in some situations, such as just prior to physically surrendering the mobile device, the user may perform these steps directly from the mobile device to disable access to its locally-stored protected information.

After the password server (101) validates the user's credentials, the user is allowed to select a mobile device (h), especially if the user is associated with more than one device embodying the present invention, and subsequently (or in the same action) to disable (i) the password server from providing the decrypting password to the selected mobile device. The password server responds appropriately, such as by disabling the specially-designated URL to which the password requests are sent by the mobile device.

Subsequent to the disabling, when the mobile device (100) attempts to retrieve the decrypting password (j), the mobile device would not be provided the decrypting password by the password server, and in some embodiments, may be provided a response such as a HTTP error 404 (page not found error).

FIG. 4 illustrates a logical flow of actions of a mobile device and a password server corresponding to the example embodiment of FIG. 2.

Additional Uses and Applications of Embodiments of the Invention.

As will be recognized by those skilled in the art, the examples provided thus far are for illustrative purposes, and are not intended to represent the limitations of uses and embodiments according to the present invention. For example, the methods of the present invention may be used to protect data on removable storage devices, such as a removable hard drive units. And, additional methods for disabling the decryption password is to reset the password (e.g. change its value) and to modify the URL where the password server answers the password requests.

Suitable Computing Platform.

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
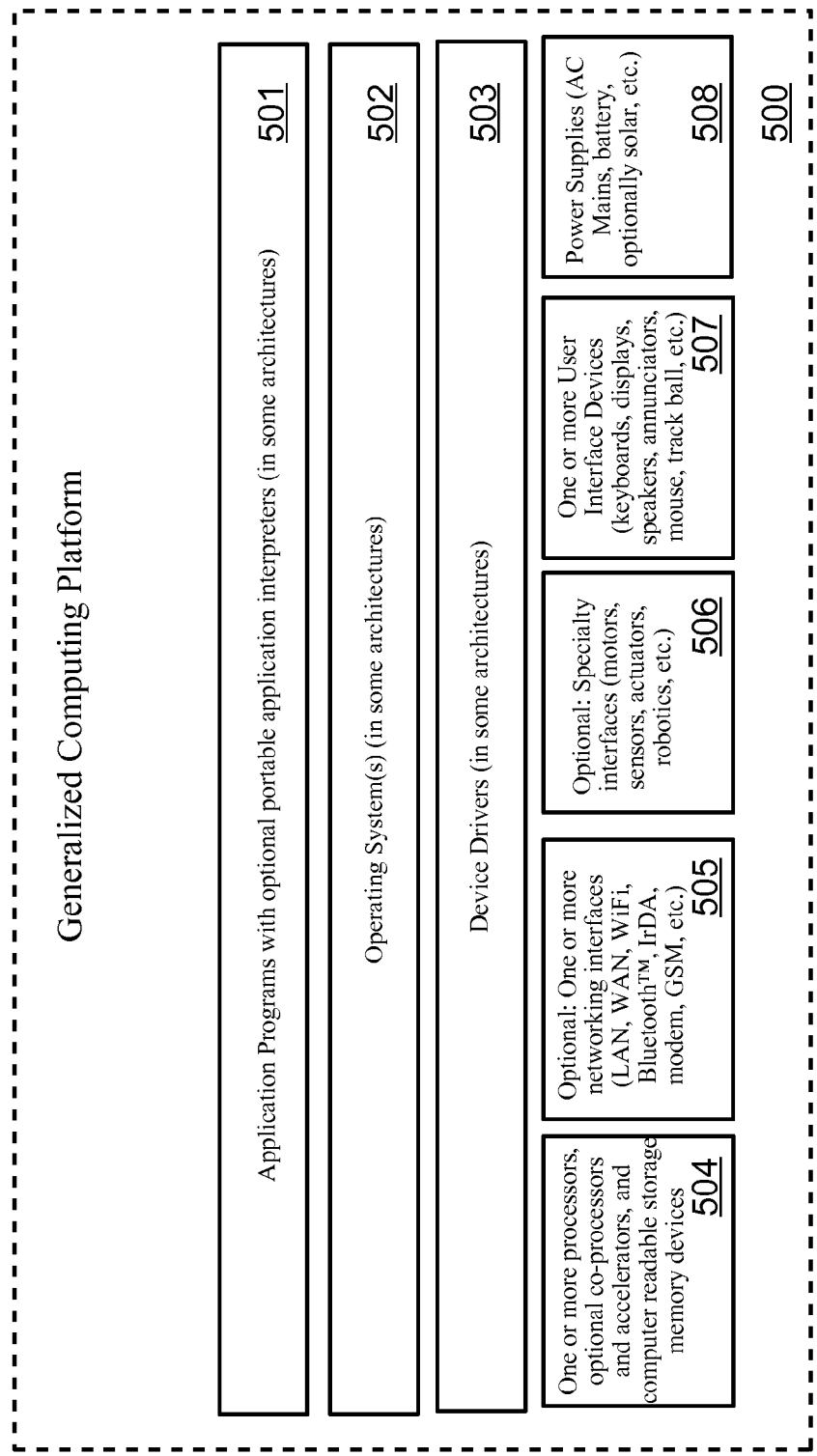
FIG. 5 sets forth a generalized architecture of computing platforms suitable for at least one embodiment of the present and the related inventions.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. These computing platforms and operating systems (without the customized logical processes of the present invention) are well known and openly described in any number of textbooks, websites, and public "open" specifications and recommendations, diagrams and further details of these computing systems in general are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

Available Variations in Embodiments Beyond the Examples Provided Herein. The terminology used in this disclosure is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step-plus-function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for protecting information and data stored on and by a mobile device comprising:
   protecting with a password one or more items of information stored within a local tangible, computer-readable storage memory device of the mobile device, wherein persistent local storage of the password is avoided;
   upon detection of a trigger event by the mobile device, transmitting a first request from a remotely-located password server to retrieve the password, wherein the trigger event comprises at least a device unlocking operation performed on a user interface of the mobile device without requiring access to a remote authentication server, and wherein the request is transmitted to a first pre-determined Universal Resource Locator;
   receiving the password by the mobile device from the remote password server; and
   using by the mobile device the received password to allow user access the locally-stored information, wherein the locally-stored data otherwise remains inaccessible to a user, and wherein a second transmitted request to the first pre-determined Universal Resource results in receipt of a protocol error;
   wherein the detection of a trigger event further comprises a detection of a user interface event selected from the group consisting of operation of a slide button, performance of a screen swipe sequence, operating of a user fingerprint recognizer, operation of a user voice recognizer, and detection of a free space gesture as recorded by a motion sensor of the mobile device.

2. The method as set forth in claim 1 further comprising, responsive to a second trigger event, transmitting a request to a second pre-determined Universal Resource Locator.

3. The method as set forth in claim 1 wherein the mobile device comprises a device selected from the group consisting of a smart phone, a cellular phone, a netbook computer, a pad computer, a tablet computer and a laptop computer.

4. The method as set forth in claim 1 wherein the transmitting of a first request comprises transmitting the request on a wireless telephone network.

5. The method as set forth in claim 1 further comprising commanding the password server to disable returning the corresponding password to the mobile device.

6. The method as set forth in claim 5 wherein the disabling includes disabling of the first pre-determined Universal Resource Locator.

7. A computer program product for protecting information and data stored on and by a mobile device comprising:
   a tangible, computer-readable storage memory device of a mobile device;
   program instructions encoded by the tangible, computer-readable storage memory device for causing a processor of the mobile device to perform operations of:
      protecting with a password one or more items of information stored within the local tangible, computer-readable storage memory device wherein persistent local storage of the password is avoided;
      upon detection of a trigger event, transmitting a first request from a remotely-located password server to retrieve the password, wherein the trigger event comprises at least a device unlocking operation performed by on a user interface of the mobile device without requiring access to a remote authentication server, and wherein the request is transmitted to a first pre-determined Universal Resource Locator;
      receiving from the remote password server the password; and
      using the received password to allow user access the locally-stored information, wherein the locally-stored data otherwise remains inaccessible to a user, and wherein a second transmitted request to the first pre-determined Universal Resource results in receipt of a protocol error;
   wherein the detection of a trigger event further comprises detection of a user interface trigger event selected from the group consisting of operation of a slide button, performance of a screen swipe sequence, operating of a user fingerprint recognizer, operation of a user voice recognizer, and detection of a free space gesture.

8. The computer program product as set forth in claim 7 further comprising, responsive to a second trigger event, transmitting a request to a second a pre-determined Universal Resource Locator.

9. The computer program product as set forth in claim 7 wherein the program instructions are executable by a mobile device selected from the group consisting of a smart phone, a cellular phone, a netbook computer, a pad computer, a tablet computer and a laptop computer.

10. The computer program product as set forth in claim 7 wherein the program instructions further comprising program instructions for commanding the password server to disable returning the password to the mobile device.

11. The computer program product as set forth in claim 10 wherein the disabling includes disabling of the first pre-determined Universal Resource Locator.

12. A system for protecting information and data stored on and by a mobile device comprising:
   a microprocessor in a mobile device;
   a tangible, computer-readable storage memory device of the mobile device;
   program instructions encoded by the tangible, computer-readable storage memory device for causing the processor to perform operations of:
      protecting with a password one or more items of information stored within the local tangible, computer-readable storage memory device wherein persistent local storage of the password is avoided;
      upon detection of a trigger event, transmitting a first request from a remotely-located password server to retrieve the password, wherein the trigger event comprises at least a device unlocking operation performed by on a user interface of the mobile device without requiring access to a remote authentication server, and wherein the request is transmitted to a first pre-determined Universal Resource Locator;
      receiving from the remote password server the password; and
      using the received password to allow user access the locally-stored information, wherein the locally-stored data otherwise remains inaccessible to a user, and wherein a second transmitted request to the first pre-determined Universal Resource results in receipt of a protocol error;
   wherein the trigger event comprises a user interface event selected from the group consisting of operation of a slide button, performance of a screen swipe sequence, operating of a user fingerprint recognizer, operation of a user voice recognizer, and detection of a free space gesture.

13. The system as set forth in claim 12 further comprising, responsive to a second trigger event, transmitting a request to a second a pre-determined Universal Resource Locator.

14. The system as set forth in claim 12 wherein mobile device comprises a device selected from the group consisting of a smart phone, a cellular phone, a netbook computer, a pad computer, a tablet computer, a mobile data storage device, a removable data drive, and a laptop computer.

15. The system as set forth in claim 12 wherein the program instructions further comprise program instructions for sending a command to the password server to disable returning the password to the mobile device.

16. The system as set forth in claim 15 wherein the disabling includes disabling of the first pre-determined Universal Resource Locator.

* * * * *